US007222241B2

(12) United States Patent
Milgramm et al.

(10) Patent No.: US 7,222,241 B2
(45) Date of Patent: May 22, 2007

(54) BUILDING SECURITY AND ACCESS PROTECTION SYSTEM

(75) Inventors: Michael Milgramm, Valley Stream, NY (US); Viatcheslav Stroutchkov, Brooklyn, NY (US)

(73) Assignee: Info Data, Inc., New York, NY (US)

( * ) Notice: Subject to any disclaimer, the term of this patent is extended or adjusted under 35 U.S.C. 154(b) by 726 days.

(21) Appl. No.: 10/082,904

(22) Filed: Feb. 25, 2002

(65) Prior Publication Data

US 2003/0163709 A1 Aug. 28, 2003

(51) Int. Cl.

| | |
|---|---|
| ***H04L 9/00*** | (2006.01) |
| ***G08B 13/00*** | (2006.01) |
| ***H04Q 7/00*** | (2006.01) |
| *G09G 5/00* | (2006.01) |
| *G06K 5/00* | (2006.01) |

(52) U.S. Cl. ...................... 713/186; 345/810; 235/380; 235/382; 340/825; 340/5.1; 340/539.16; 340/825.49

(58) Field of Classification Search ................ 713/200, 713/186; 705/9; 726/2

See application file for complete search history.

(56) References Cited

U.S. PATENT DOCUMENTS

| | | | | |
|---|---|---|---|---|
| 6,189,783 | B1 * | 2/2001 | Motomiya et al. | 235/375 |
| 6,394,356 | B1 * | 5/2002 | Zagami | 235/487 |
| 6,496,595 | B1 * | 12/2002 | Puchek et al. | 382/124 |
| 6,504,470 | B2 * | 1/2003 | Puchek et al. | 340/5.53 |
| 6,581,161 | B1 * | 6/2003 | Byford | 713/182 |
| 6,856,962 | B2 * | 2/2005 | Yonemitsu | 705/8 |
| 6,971,029 | B1 * | 11/2005 | Avery, IV et al. | 340/5.5 |
| 6,976,269 | B1 * | 12/2005 | Avery et al. | 726/2 |
| 2001/0014948 | A1 * | 8/2001 | Ooki et al. | 713/201 |
| 2001/0037219 | A1 * | 11/2001 | Malik | 705/2 |
| 2001/0049617 | A1 * | 12/2001 | Berenson et al. | 705/8 |
| 2002/0013724 | A1 * | 1/2002 | Kudo et al. | 705/9 |
| 2002/0063154 | A1 * | 5/2002 | Hoyos et al. | 235/382.5 |
| 2002/0118096 | A1 * | 8/2002 | Hoyos et al. | 340/5.52 |
| 2003/0023874 | A1 * | 1/2003 | Prokupets et al. | 713/201 |
| 2003/0151761 | A1 * | 8/2003 | Burns | 358/1.14 |

* cited by examiner

*Primary Examiner*—Christopher Revak
*Assistant Examiner*—Arezoo Sherkat
(74) *Attorney, Agent, or Firm*—Ostrolenk, Faber, Gerb & Soffen, LLP

(57) ABSTRACT

A building security system which allows clients of building tenants to set up their own appointments, allows the building tenants to control and analyze such appointment scheduling, and enables building security personnel to analyze and control the number of visitors to the building. Visitors schedule their appointments via a visitor interface part of the system and providing the required appointment schedule information. Security personnel have integrated information concerning the number of visitors expected for a particular day, the number of visitors already in the building, and the number of past visitors for that day. Detailed information about visitors, and information on visitor's entering or leaving the building is also available. Because, visitors' information is already stored on the system, the security guard may also readily print a visitors pass as necessary. Security personnel with special access privileges (e.g., security manager) have access to building's visiting activity reports.

19 Claims, 19 Drawing Sheets

Sign Appointment (Visitor's)

Client Information

Appointment Details

TEMPLATES

1. Login

2. Appointments (Employee)

| Date | Time | Visitor | Company | Department | Phone | Ext | Action |
|---|---|---|---|---|---|---|---|
| 11/16/01 | 12:25PM | Mitchell Darric | InformWeek | Accounting | (516) 562-5144 | | |
| 11/16/01 | 09:45PM | Mayer Patricia | Comsys | Sales | (516) 562-5594 | | |
| 11/21/01 | 12:00PM | Mitchell Darric | InformWeek | Accounting | (516) 562-5144 | | |

3. Appointment (Receptionist)

5. Appointment Edit

6. Visitors

5. History FIG. 13

2. Expected Visitors FIG. 14

3. Expected Visitors List

4. Currently in Building FIG. 16

| Company | Location | Phone | Ext |
|---|---|---|---|
| A1 Electronics | floor 15 | 626-854-3499 | |
| ABI Corporation | floor 43, S#201 | 408-946-8710 | |
| Airport transportation | floor 45 | 212-666-6666 | |
| Alcoholizm Treatment Center | floor 55 | 800-522-5353 | |
| Alliance computer systems Inc. | floor 20 | 516-781-8108 | |
| Aurora concert Inc | floor 54 | 789-444-4444 | 545 |
| Buccelatti Inc | floor 37,38,67 | 212-308-2900 | |

4. Currently in Building List FIG. 17

6. History List

| | Entered | Left | Stay |
|---|---|---|---|
| Visitors: | 8 | 3 | 5 |

| Visitor | Went In | Went Out | Invited By | Location | Phone | Ext |
|---|---|---|---|---|---|---|
| Patricia Mayer | 10:45AM | 10:47AM | Tan-Fung Lan | | 212 727-1671 | 109 |
| Margaret Kelly | 10:44AM | 10:47AM | Eva Katz | | 212 727-1671 | 123 |
| Darric Mitchell | 10:44AM | 10:47AM | Tan-Fung Lan | | 212 727-1671 | 109 |

BUILDING SECURITY AND ACCESS PROTECTION SYSTEM

FIELD OF THE INVENTION

The present invention relates to a field of building security. More specifically, the present invention relates to a field of monitoring visitors' access to a secured building.

BACKGROUND OF THE INVENTION

A typical building security system comprises various devices which limit access to the building to only individuals who possess a proper access code or access device, such as a key card. Building security systems, where security personnel is notified of incoming visitors, are also known in the art. In this security system, a visitor would schedule an appointment (typically over a telephone) with an employee working in a secured building, and the employee would then convey visitor's information to the building security personnel, which, in turn, would issue a security pass allowing the visitor to access the building.

Personnel security systems utilizing fingerprint matching are also commonly used and well accepted for personnel identification. Each fingerprint has a distinctive pattern of ridges and valleys that makes the fingerprint unique. The overall ridge patterns of fingerprints can be classified according to their distinctive shapes into several classes of morphology, including loops, arches, and whorls. The individual ridges of fingerprints have distinctive orientations, spacings, terminations, and bifurcations. Fingerprint matching methods are based on the premise that the combination of these features in any one fingerprint is unique. One use of the fingerprint matching technique is in access control, wherein personnel are permitted or denied access to a controlled area based on comparisons with a data base of fingerprints. The controlled area may be a physical area, in which case access is controlled by a physical barrier, or a virtual area such as a computer program or data base, in which case access is controlled by an electric barrier. The data base of fingerprints is constructed during an enrollment procedure that consists of recording in some form the fingerprints of those individuals who are to be permitted access. Once the data base has been constructed, an individual will be granted access by way of a verification procedure only if the fingerprint presented for verification matches the stored fingerprint data of a particular enrolled individual.

SUMMARY OF THE INVENTION

It is an object of the present invention to provide a complete building security system encompassing all aspects of building access.

It is another object of the present invention to provide a building security system allowing visitors to set up their own appointments at the time and date convenient for them.

It is a further object of the present invention to provide a building security system enabling building employees to monitor, analyze and approve (or disapprove) appointments scheduled by building visitors.

It is still a further object of the present invention to provide a building security system enabling building security personnel to monitor, analyze and control the number of building visitors at any given time as well as visitors' access to various companies, floors, suites, etc. of the building.

It is still another object of the present invention to secure an access to the provided building security system using biometric technology.

The present invention provides a complete solution for a secured access to an office building. In the preferred embodiment, the building security system allows clients of various companies located in the building to set up their own appointments, allows employees of these companies to control and analyze scheduling of such appointment, and enables building security personnel to analyze and control the number of visitors to the building at any given time period. Visitors schedule their appointments by accessing a scheduling part of the system and providing the required information and a desired day and time of the appointment. The information is stored in database segments which are accessible by authorized employees only. All information for a current day is gathered from employees' database segments and is combined and analyzed by the security personnel. A security guard has integrated information concerning the number of visitors expected for a particular day, the number of visitors already in the building, and the number of visitors who already visited the building on the selected day. Detailed information about visitors is also available. By clicking on a provided button, a guard records the fact of visitor's entering or leaving the building. Because, visitors' information is already stored on the system, the security guard may also print visitors passes with a single mouse click, when an authorized visitor enters the building. A security personnel with special access privileges (e.g., security manager) can request and receive a statistical report of building's visiting activity sorted by date, company, visitor and so on.

The above and other objects, aspects, features and advantages of the invention will be more readily apparent from the description of the preferred embodiments thereof taken in conjunction with the accompanying drawings and appended claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENT AND THE DRAWINGS

Figure 1:
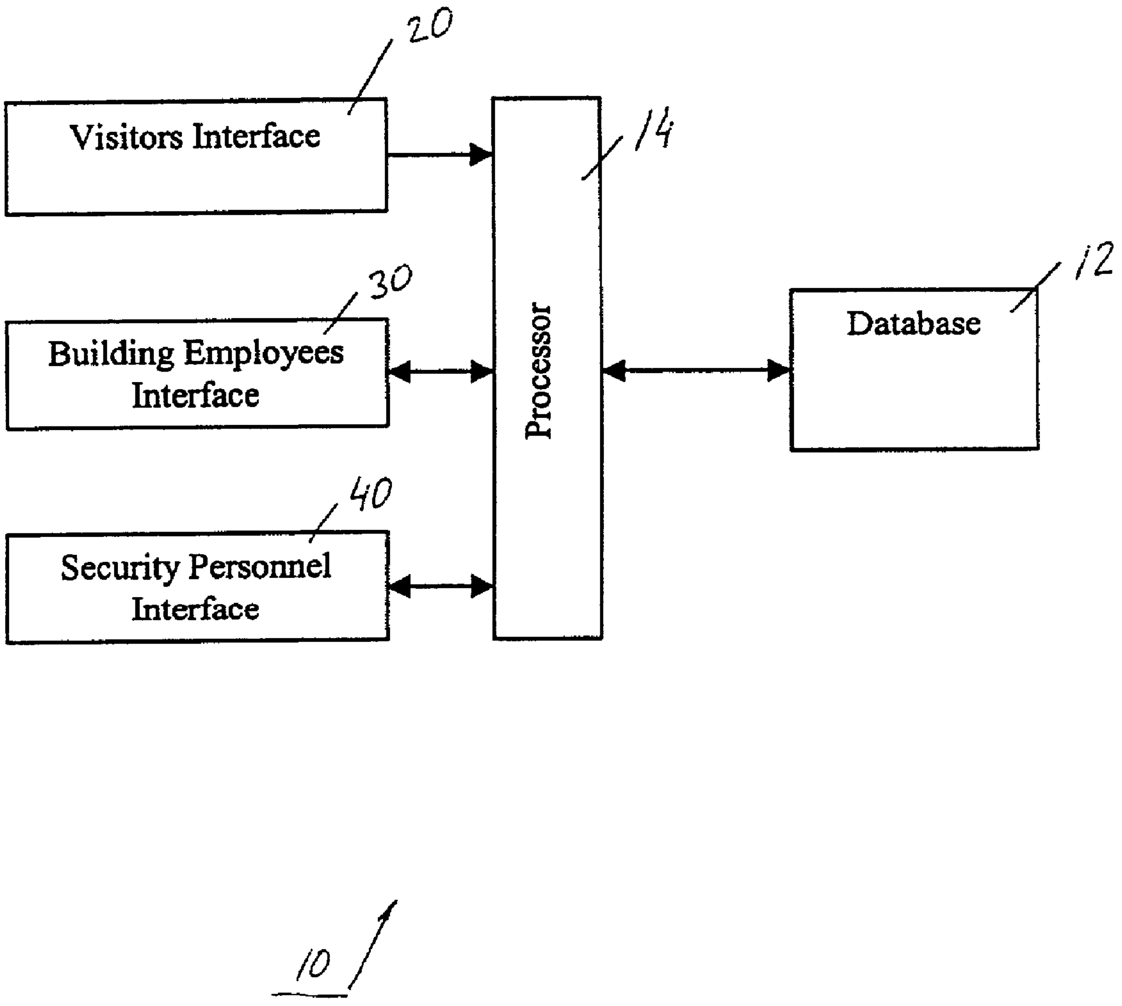
FIG. 1 is a schematic block-diagram of the preferred embodiment of the present invention.

The preferred embodiment of the present invention is generally shown in FIG. 1. In the preferred embodiment of the present invention, the building security system 10 includes a visitors interface 20, a building employee interface 30, a security personnel interface 40, a processor 14 and a database 12. An individual visitor enters his/her personal information using the visitors interface 20. This information is processed by the processor 14, stored in the database 12, and then provided to a building employee through the building employee interface 30 and to a security employee through the security personnel interface 40. In addition to the visitors information, employees' and security personnel's biometric information is also stored in the database 12 to enable system access validation.

Figure 2:
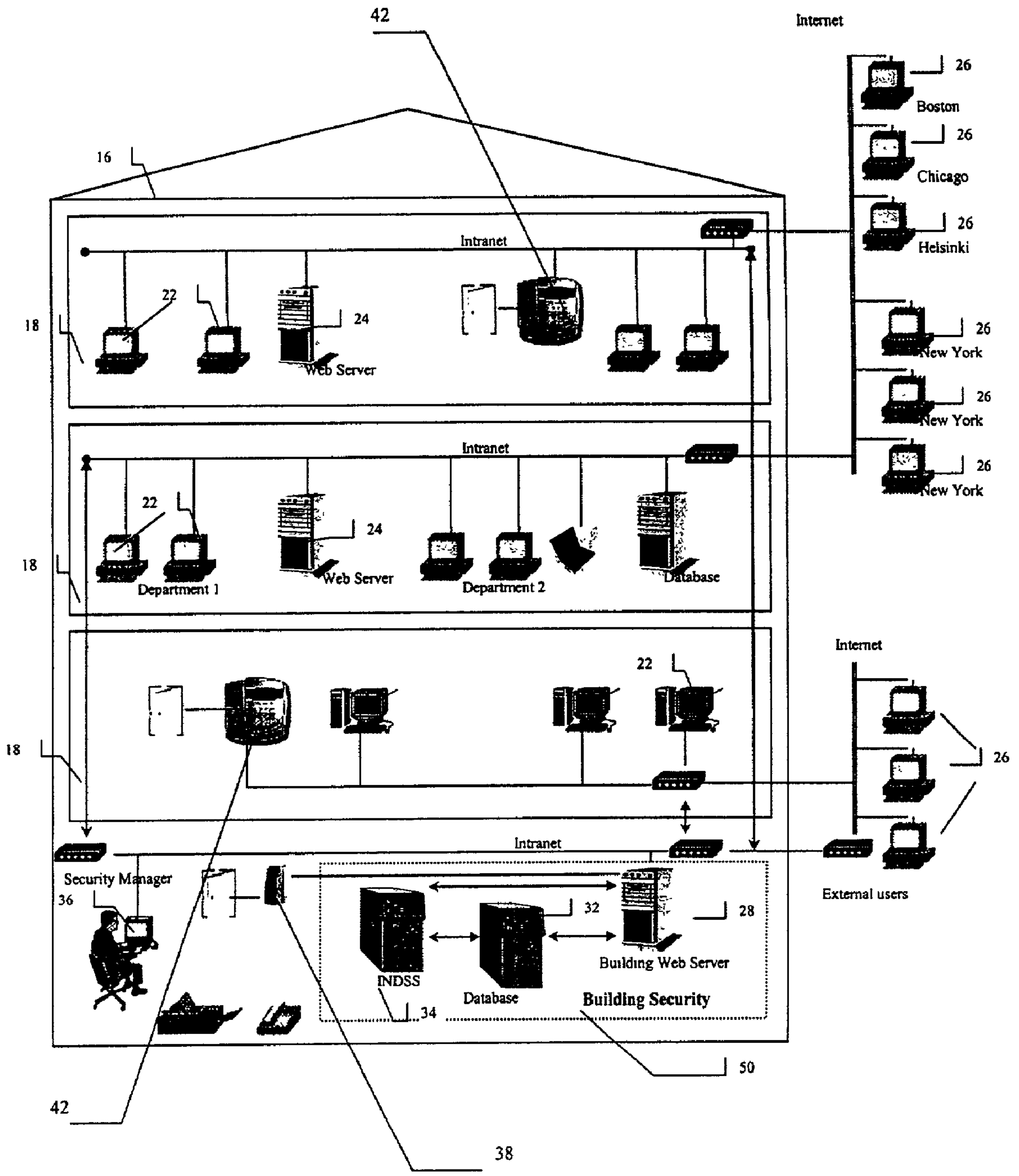
FIG. 2 is a detailed block-diagram of the preferred embodiment shown in FIG. 1.

A more detailed structure of the provided security system 10 is shown in FIG. 2. As shown in FIG. 2, an office building 16 has various companies 18 located therein. Each company 18 has a plurality of computer terminals 22 connected to the Internet either directly or through a provided web server 24. Within individual companies 18, computer terminals 22 may be connected into local Intranet networks having their own server (not shown). Potential building visitors may access the building security system over the Internet using their own computer terminals 26. A security guard is also provided with a computer terminal 36. A biometric scanning device 38 associated with an entrance door may also be provided in the building as part of the security system 50. As explained below, the scanning device 38 preferably registers arrival and departure of visitors and employees with registered biometric information. As shown in FIG. 2, each floor access (e.g., doors, elevators, etc.) may be also provided with a biometric access protecting device 42. The device 42 is preferably associated with a door lock and may activate a door's unlocking mechanism when an authorized and validated biometric information is entered into the system through the device 42. The building 16 is further provided with a building web server 28, a database 32, and a biometric verification server 34, which are preferably connected through a secured link to all building Intranets, individual terminals 22 and security terminals 36. The building web server 28, database 32, and biometric verification server 34 may be implemented on a single building security server 50.

In the preferred embodiment, the visitors interface 20 interfaces between visitors terminals 26 and the building security server 50. The building employees interface 30 preferably interfaces between employees computer terminals 22 and the building security server 50. The security personnel interface 40 preferably interfaces between security computer terminals 36 and the building security server 50.

Figure 3:
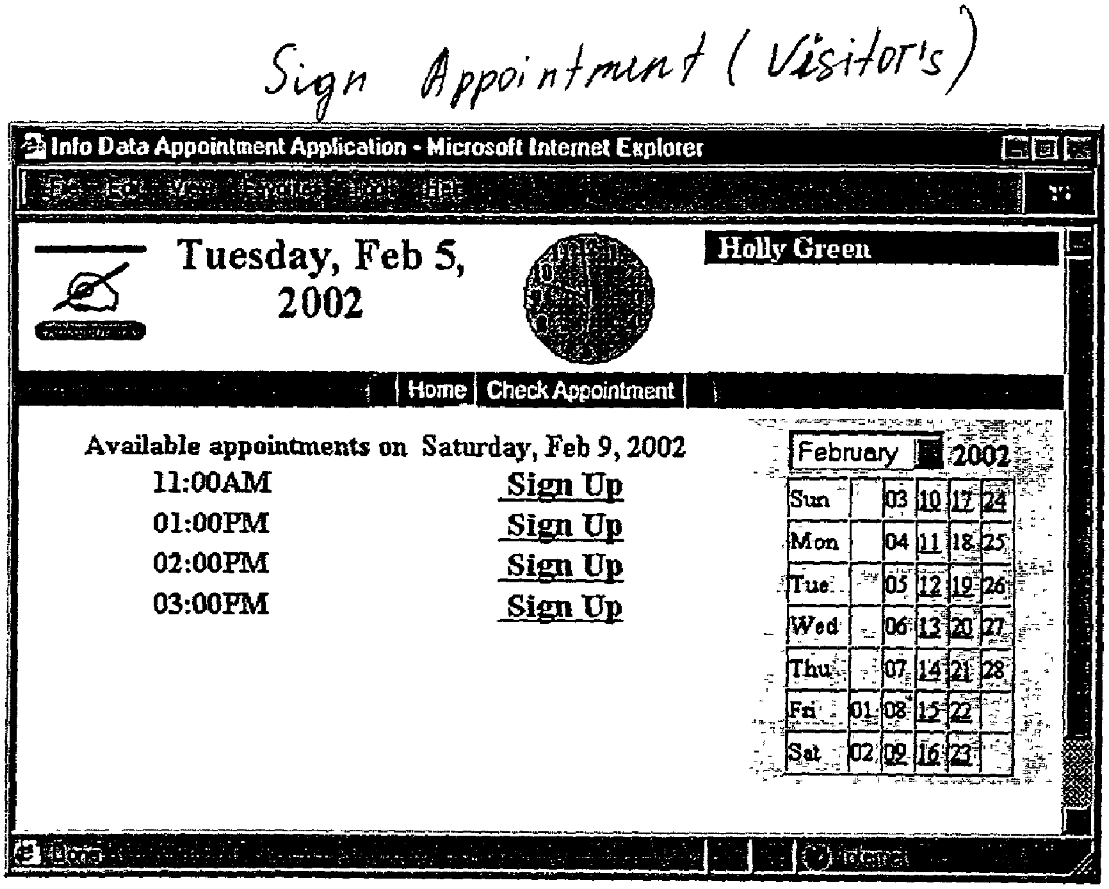
FIG. 3 is a screen shot of a list of available time slots as presented to the visitor.
Figure 4:
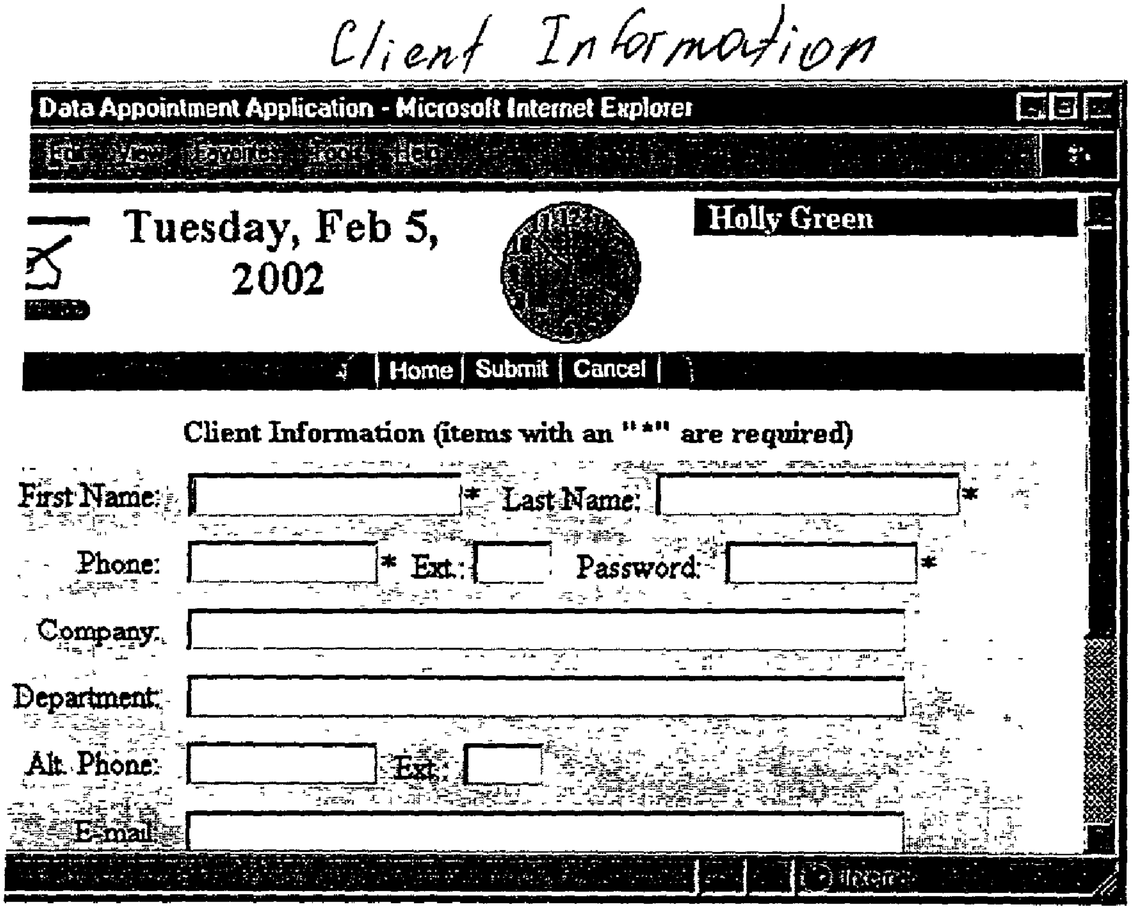
FIG. 4 is a screen shot of a visitor information screen.

In the preferred embodiment, the visitors interface 20 allows each visitor to schedule an appointment on-line and check for its approval. A visitor may access the system via the Internet after creating and entering a username and password. The visitor can then select the company within the building and an employee in the company to set up a desired appointment. For each individual employee, the visitor can select a date for which he/she wants to make an appointment and a list of available time slots is presented to the visitor, as shown in FIG. 3. An alternative date may be selected from a provided calendar. To make an appointment, the visitor may click on the "Sign up" link provided next to all available time slots. The selection will prompt the system to bring up a visitor information screen, shown in FIG. 4. After entering required information, the visitor may submit his/her request for appointment by clicking the "Submit" button at the top of the screen. The visitor can exit this screen without making an appointment by clicking on the "cancel" button. In addition to the information required if the screen shown in FIG. 4, the system may be set up to ask the visitor to enter his/her biometric information, which will provide additional security to the system.

Figure 5:
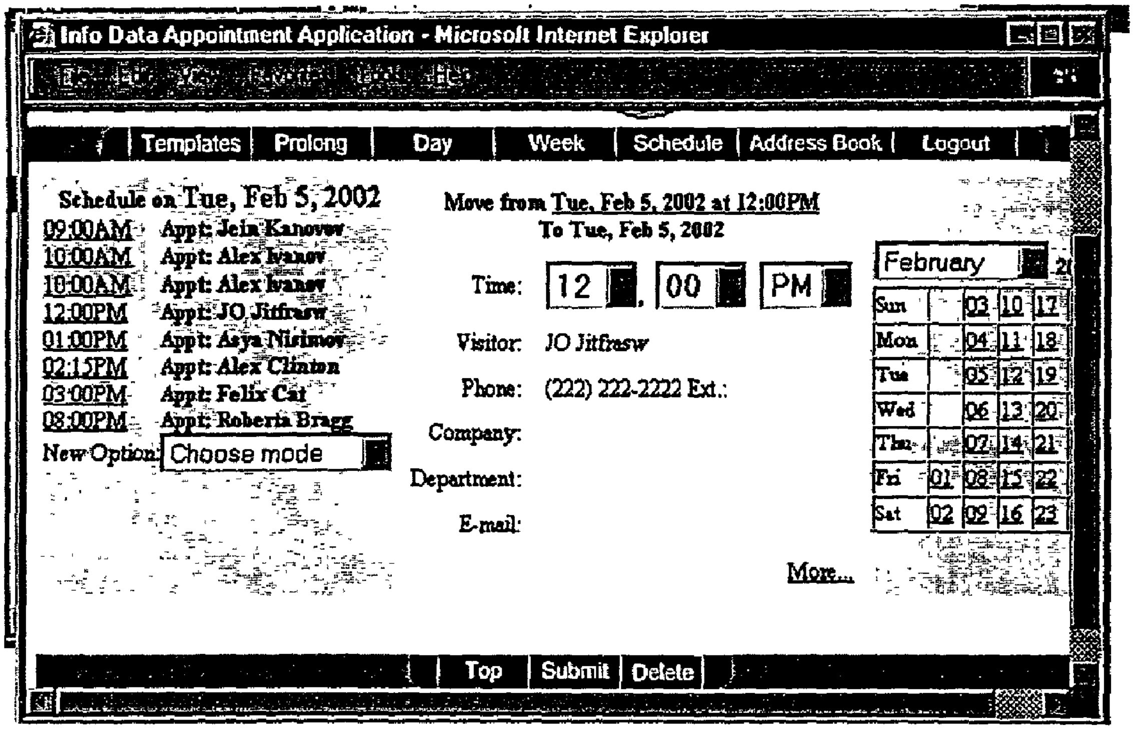
FIG. 5 is a screen shot of an employee schedule screen.

A building employee can create, manage and customize a database of visitors using the building employees interface 30. The interface 30 also allows the employee to store contact information and searchable history of appointments on-line. After a visitor scheduled an appointment with a building employee, the employee can post an appointment approval on-line, send an e-mail notification and/or confirm the appointment on the telephone. In the preferred embodiment of the present invention, building employees can access the system by entering their biometric information, for example by submitting their fingerprints. After accessing the system, the employee is taken to his/her schedule screen, shown in FIG. 5. Appointments for the selected date are shown in descending order. Employees can alter their scheduled (and not yet approved) appointments by clicking on the time of the scheduled appointment. The selection will prompt the system to bring up the record for the selected date in a detailed appointment screen and will allow changes to be entered. A selected appointment may be deleted, by selecting "Delete" button at the bottom of the screen, or rescheduled by selecting a different date from the provided calendar and then entering a desired time. The rescheduled appointment will be recorded in the system after the employee selects the "Submit" button at the bottom of the screen. The visitor will then be notified of the appointment change and may access the system again to enter his/her own changes.

Figure 6:
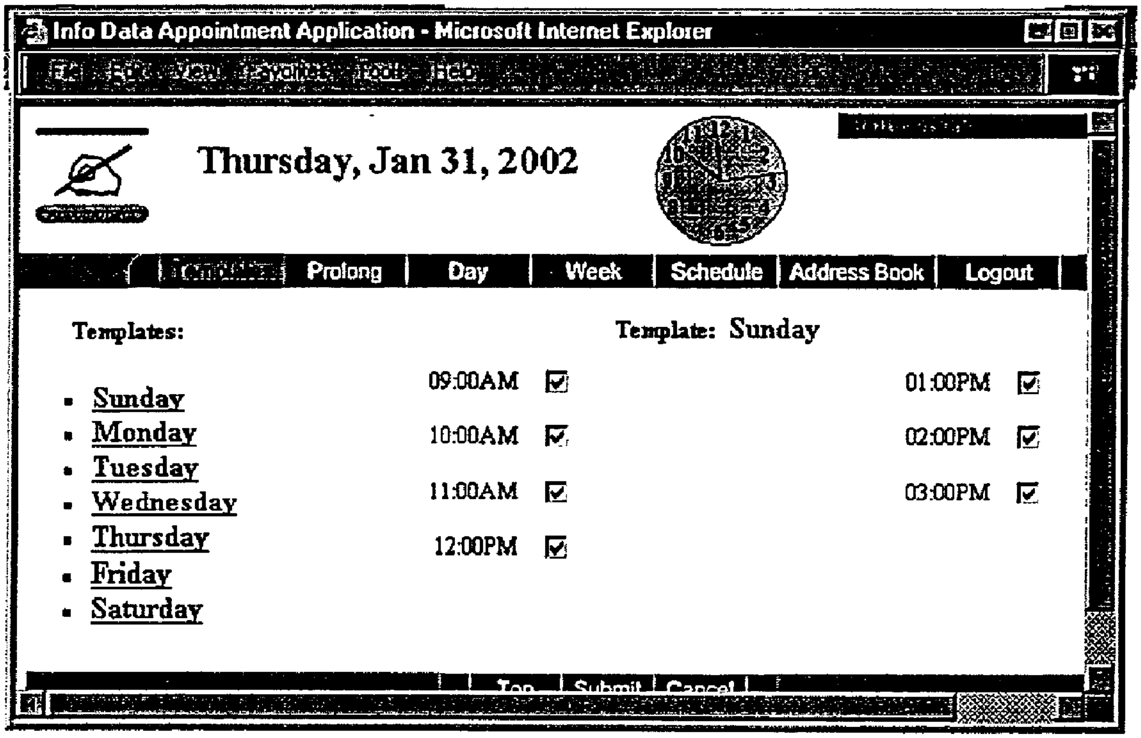
FIG. 6 is a screen shot of an employee schedule templates screen.
Figure 7:
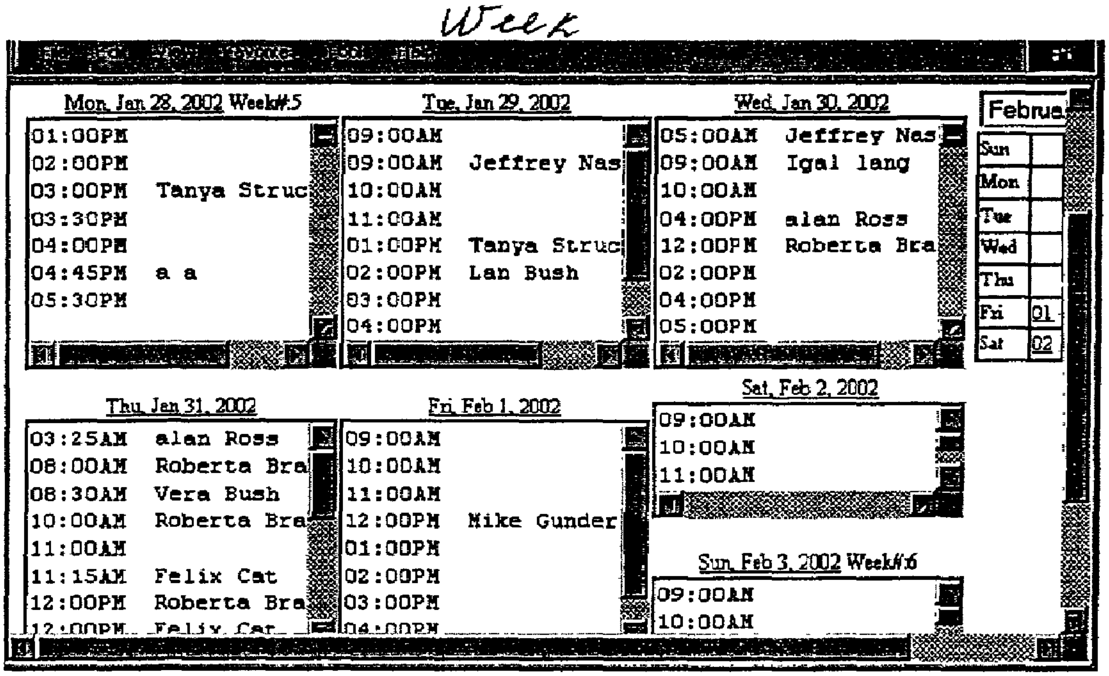
FIG. 7 is a screen shot of a screen showing employee's appointments for an identified week.

By accessing the templates screen, shown in FIG. 6, a user can setup his/her available schedule slots for a particular day of the week of for the entire week. The selected available time slots will then be shown as available on the visitors appointment screen shown in FIG. 3. By selecting a "Week" button, the system will bring up employee's appointments for an identified week, as shown in FIG. 7. Visitors' names will appear next to their selected time slots. New appointments may be created by the employee by opening a "Schedule" window.

In the preferred embodiment, the building employee interface of the present invention is designed for employees of large office buildings having security personnel. Each employee can manage his/her personal database of visitors and appointments. At the same time appointments for the current day are available for a security guard. Using biometric technology with the present security system ensures strict level of authenticity of entered information.

The system identifies employees and security personnel using their biometric information, for example fingerprint. The system preferably recognizes three different levels of access by building employees, i.e., employee, receptionist and department head. An employee has access to a limited segment of the provided database, this segment being limited to the employee's personal visits and appointments, and can operate within this identified scope only. A receptionist has an access to his/her own database of visitors and appointments and additionally to databases of employees who gave a special authorization to the receptionist to manipulate their databases. The receptionist can switch between various entrusted databases to operate on behalf of selected employees. The head of department has an access to all databases of all department employees without requiring any additional permission of these employees.

Figure 8:
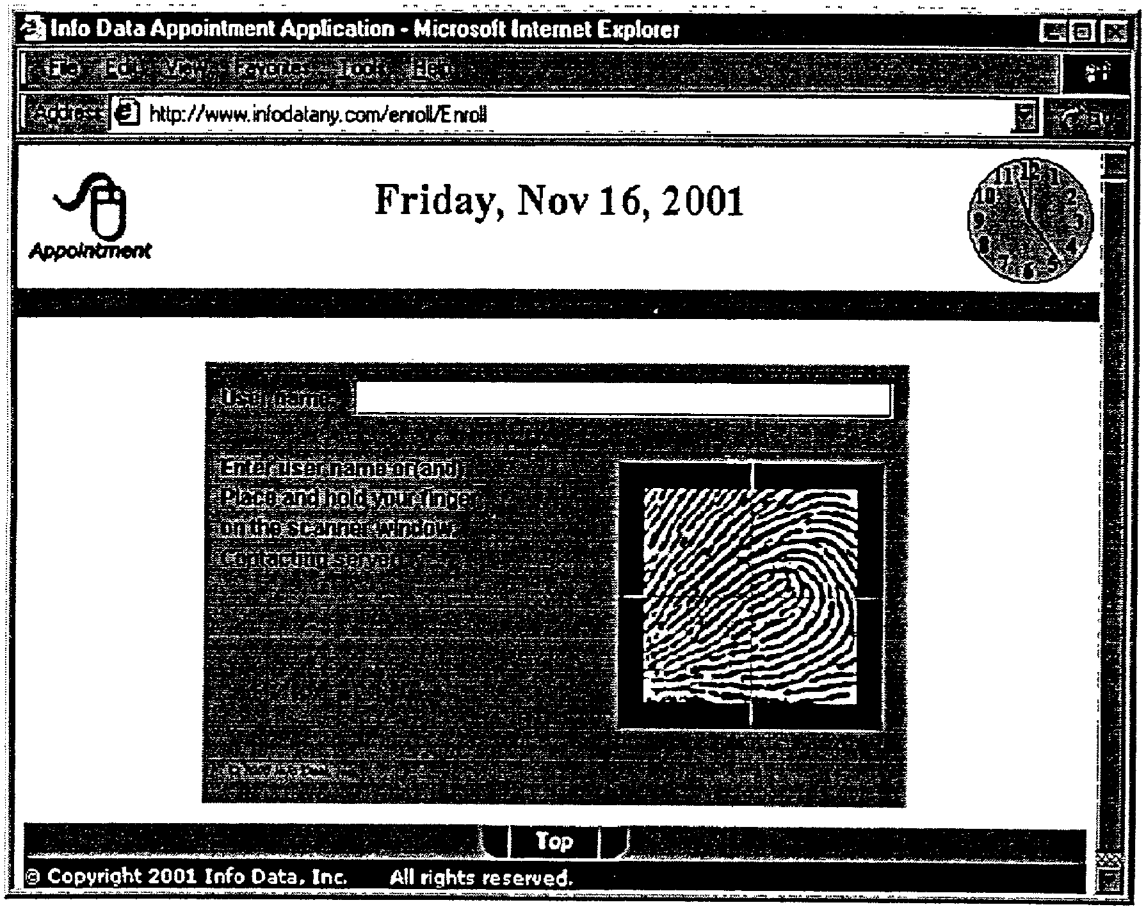
FIG. 8 is a screen shot of a biometric identification screen.
Figure 9:
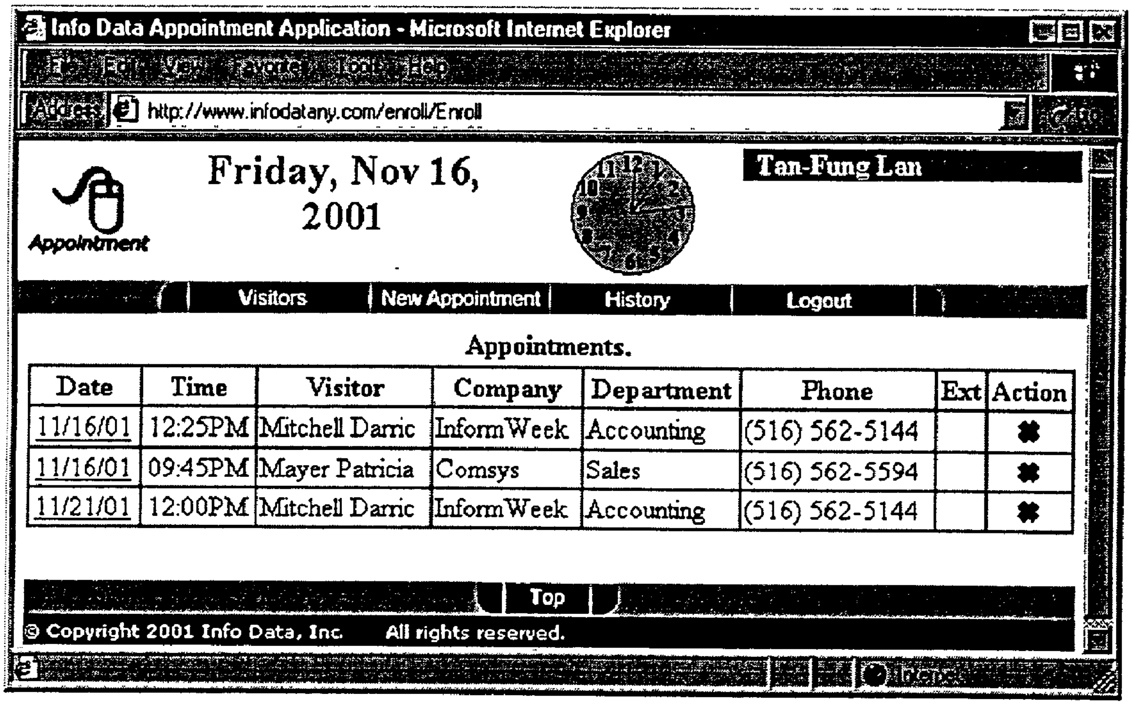
FIG. 9 is a screen shot of an employee appointment screen.

In the preferred embodiment, the employee logs into the system by uploading his/her biometric information. As shown in FIG. 8, such biometric information can be employee's fingerprint. The biometric information is preferably scanned by a scanning device connected to the employee's workstation 22 and then uploaded for comparative analysis and validation by the system. When employee's biometric data is verified by the system, the employee is taken to the employee appointment screen, shown in FIG. 9. This screen shows a list of appointments assigned for selected employee, started with the current day and sorted by date. A particular appointment is preferably shown only if the scheduled visitor has not yet entered the building, i.e., a security guard has not registered such entrance as will be described later. This screen allows the employee to change date and time of appointments by clicking on the appointment date as described above.

Figure 10:
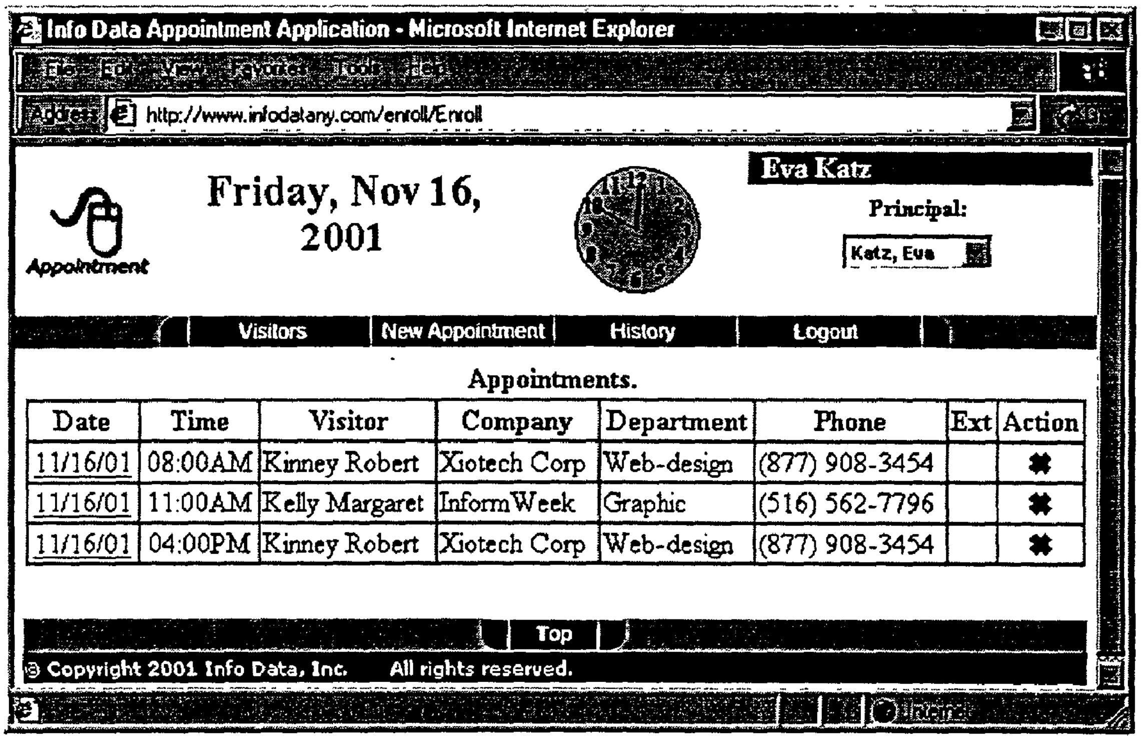
FIG. 10 is a screen shot of a receptionist's appointment screen.

A receptionist's appointment screen, shown in FIG. 10 shows a list of appointments assigned for a selected employee. A name at the top shows the actual employee (receptionist) logged in using his/her biometric information. For example, even when the receptionist is accessing a database of some other employee, the name appearing at the top of the screen is the receptionist's name. A name in the employee scroll box shows the name of the employee whose database the receptionist has accessed. By selecting a different name from this scroll box, the receptionist can access a database of a different employee. Although the receptionist is permitted to change schedule of different entrusting employees, the system preferably keeps track of these changes and can later identify the person who actually entered them.

A head of department's appointment screen allows the head of department or some other authorized employee to access appointment screens and databases of any individual employee of the department or the building. Similarly to the receptionist's appointment screen, a scroll box is provided on the head of department's appointment screen to allow the authorized employee to switch between different employee's appointment screens and individual databases.

Figure 11:
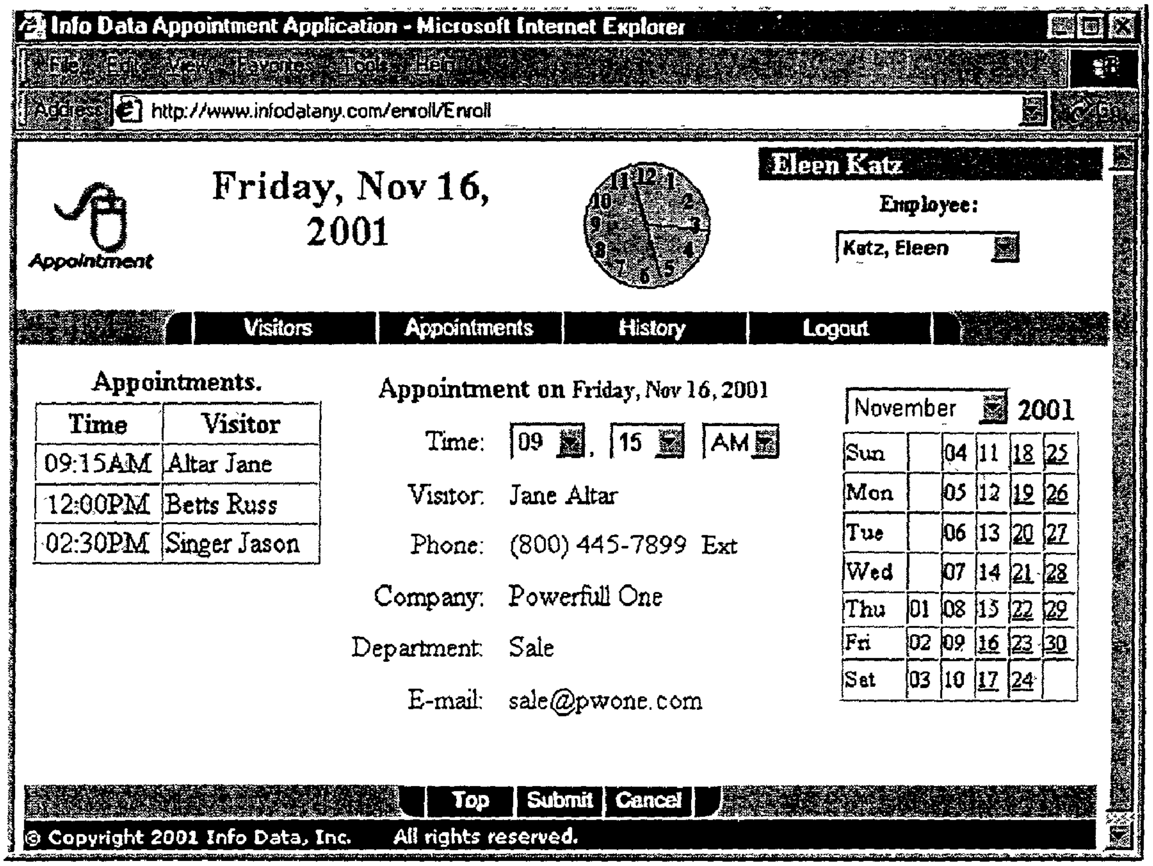
FIG. 11 is a screen shot of an appointment edit screen.

An appointment edit screen, shown in FIG. 11, allows an employee with a verified right of access to reassign appointments for selected visitors. A name in the top corner of the screen identifies the visitor who has logged into the system using his/her biometric information. The name in the scroll box identifies the employee on whose behalf the change is being made. If an employee with an access right "employee" enters this screen, the scroll box does not appear on this screen. For employee's convenience, visitor's contact information appears in the same screen. To make an appointment, the employee can choose a date using the provided calendar, select desired time and click on submit button at the bottom toolbar. Selecting a date in the calendar changes the date of current appointment and provides the user with a list of appointments which have already been scheduled for the selected date.

Figure 12:
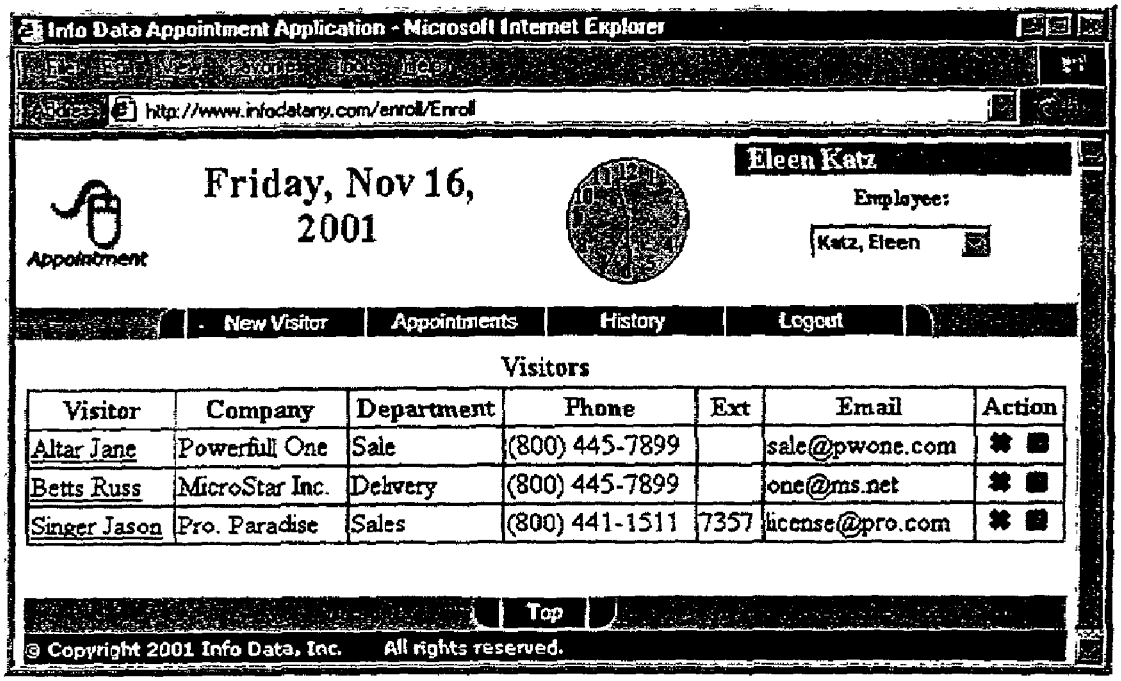
FIG. 12 is a screen shot of an employee's visitors screen.

A visitor screen, shown in FIG. 12, allows employees to manage their visitors database. An employee can create a new visitor, edit information concerning existing visitor, delete visitor from the database, and assign appointment with a selected person. The provided "new visitor" button switches to a new visitor screen (not shown), where the employee can enter new visitor's information. The employee can also change any visitor's information by clicking on the visitor's name at the visitor screen, FIG. 12, and accessing a visitor edit screen (not shown).

Figure 13:
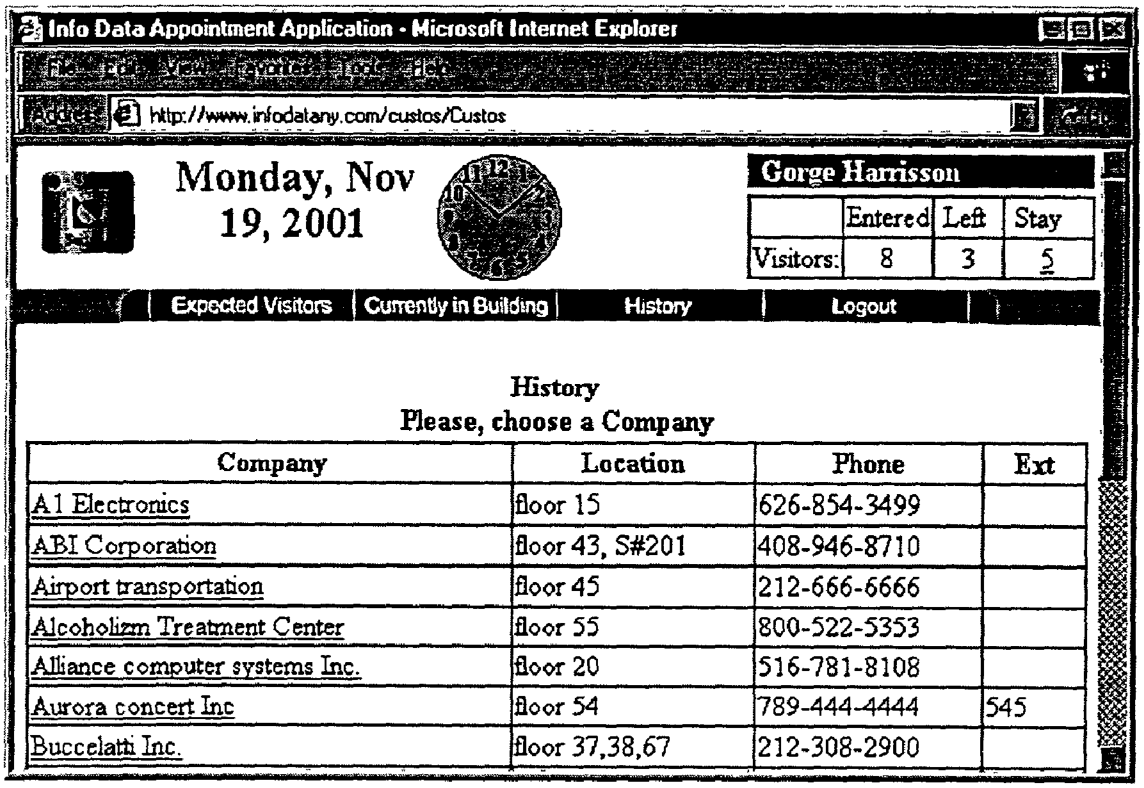
FIG. 13 is a screen shot of a visitor history screen.

The system allows employees to see visiting history for a particular visitor from their individiual databases. To access a visitor history screen, shown in FIG. 13, the employee may click on the "History" link on the visitor screen. History is provided for each visitor separately. Left part of the screen preferably contains a list of visitors from employee's personal database. Right part of the screen preferably shows a list of appointments for currently selected visitor. Columns "Entered" and "Left" show actual time when the selected visitor entered and left the office building.

The system preferably opens every session for each user by verifying user's biometric information against registered biometric data and closes the session when the user selects the logout option. Any attempt to return to the system by sending a query to the server using the browser history after the session was closed will result in an error message "access denied." In the preferred embodiment, the only way to return to the system is by logging in using the registered biometric information.

All information for a current day is gathered from employees' personal databases and is combined and analyzed by building's security personnel using the security personnel interface 40. The security personnel interface 40 provides a security guard with integrated information concerning the number of visitors expected for a particular day, the number of visitors already in the building, and the number of visitors who already visited the building on the selected day. Detailed information about individual visitors is also available. By clicking on a provided button, a guard registers the time of visitor's entering or leaving the building. Because, visitors' information is already stored on the system, the security guard may also print visitors passes with a single mouse click, when an authorized visitor enters the building. A security personnel with special access privileges (e.g., security manager) can request and receive a statistical report of building's visiting activity sorted by date, company, visitor and so on.

In the preferred embodiment of the present invention, a biometric scanning device may be provided at the entrance to the building for registering arrival and departure of visitors and employees, whose biometric information is registered by the system. When such visitor/employee arrives to the building, he/she allows the scanner to verify the biometric data (for example, by scanning the fingerprint) and then update the system with the visitor's/employee's arrival or departure information.

Similarly to other building employees, security personnel should preferably be allowed an access to the system only after providing the biometric data. Such data is stored in the provided database and is verified every time a security employee accesses the system.

Figure 14:
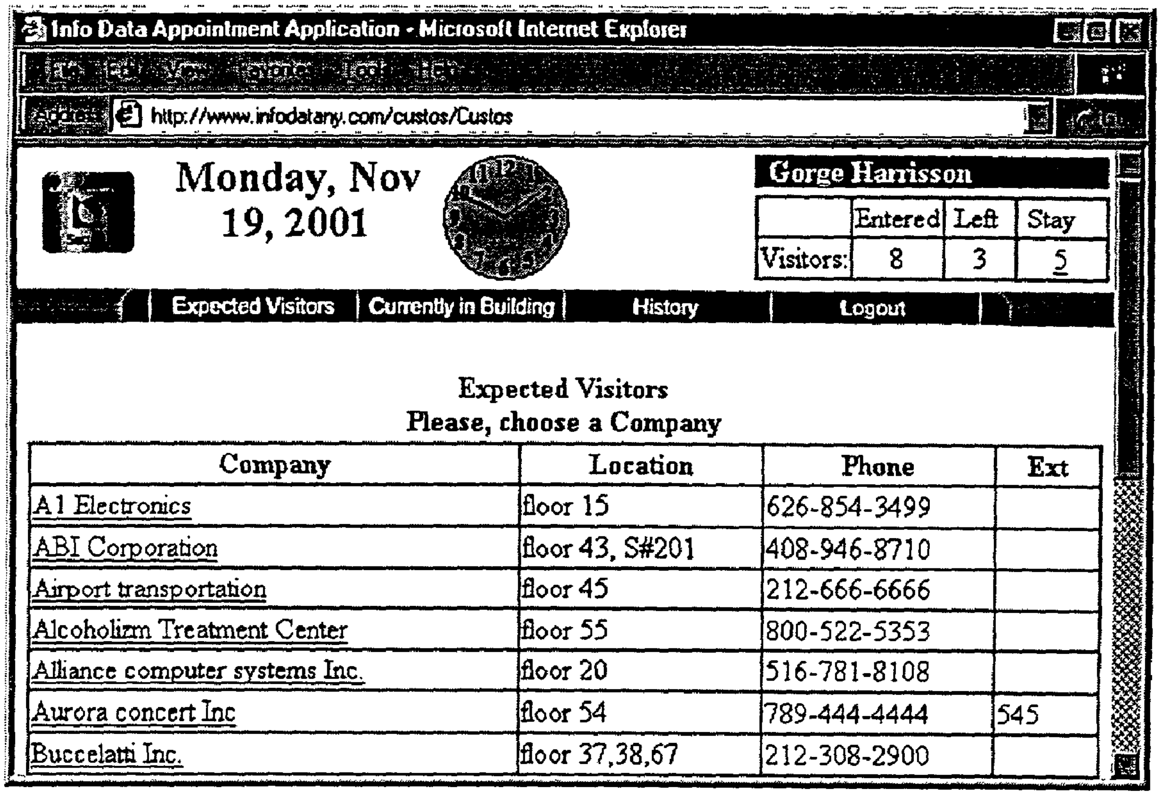
FIG. 14 is a screen shot of an expected visitors screen.
Figure 15:
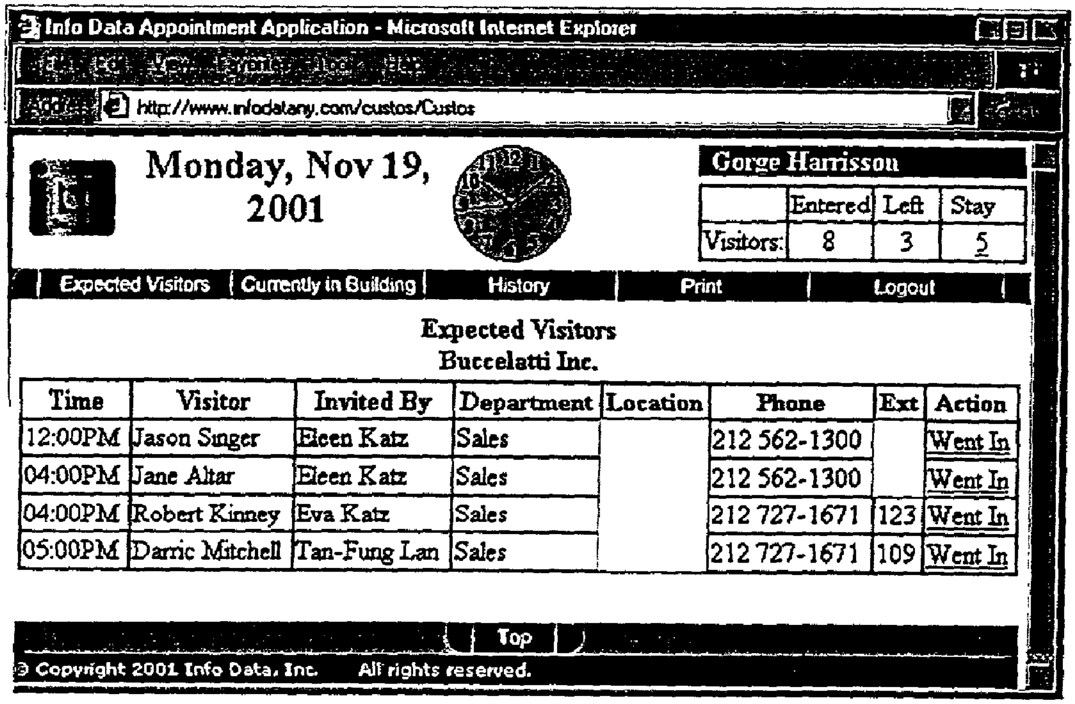
FIG. 15 is a screen shot of individual company's visitors list.

After being validated by the system, a security guard can access an expected visitors screen, shown in FIG. 14. As shown in FIG. 14, the information about visitors is provided in accordance with companies they are scheduled to visit. To access a list of expected visitors for a particular company, the security guard may select this company's name by clicking on it. The individual company's visitors list is shown in FIG. 15. This screen shows a list of visitors sorted by the name of employees having appointments with these visitors. The visitors list is also sorted by the time of the expected visit. A security guard can enter the time when the visitor went into the building by selecting the "went in" link and entering appropriate information into the provided fields.

Figure 16:
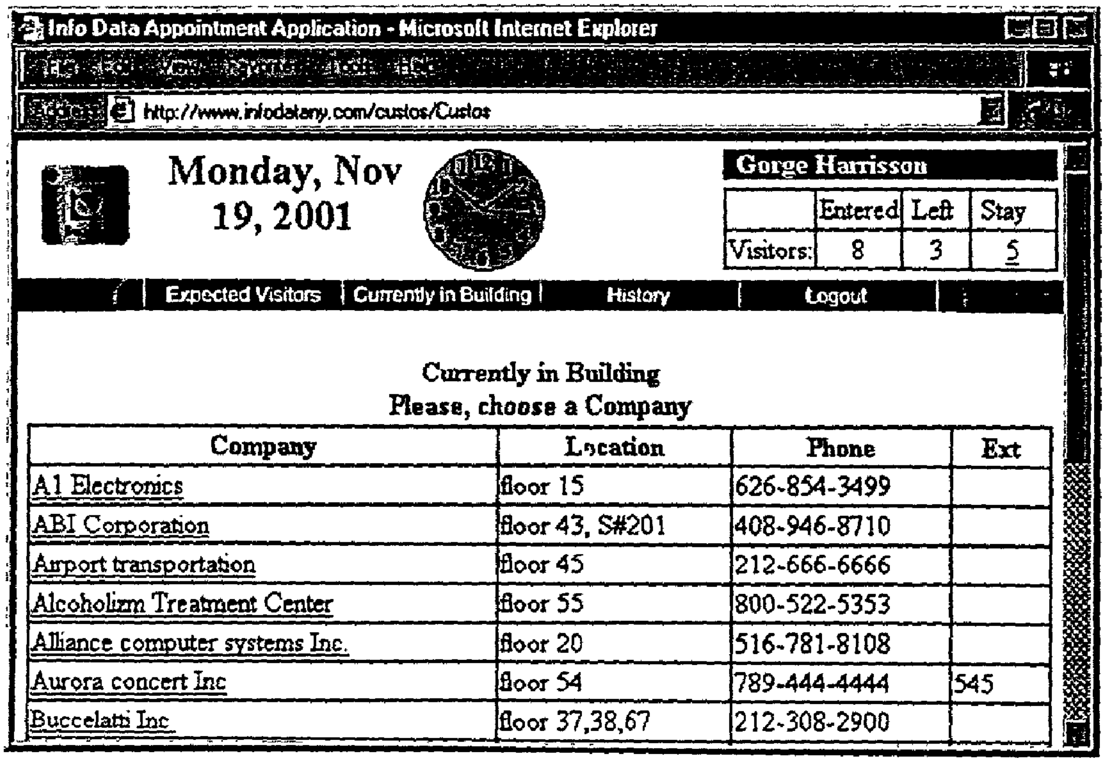
FIG. 16 is a screen shot of a "Currently in the Building" screen.
Figure 17:
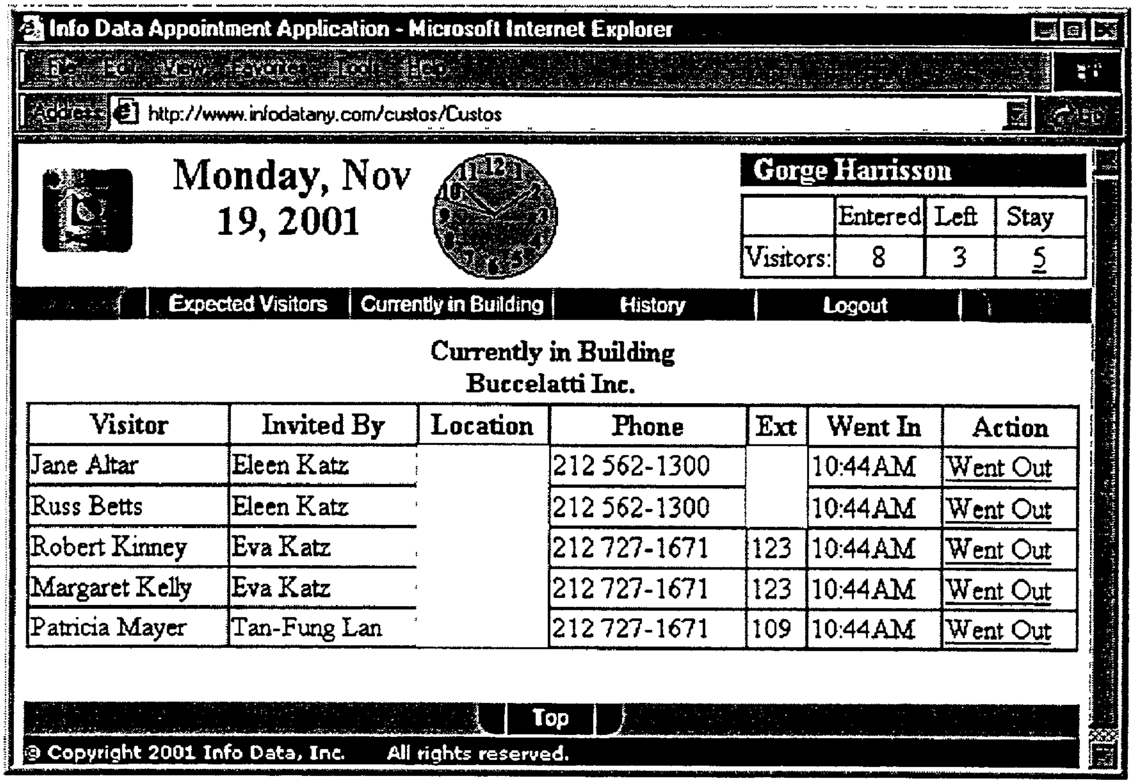
FIG. 17 is a screen shot of a screen showing the list of selected company's visitors remaining in the building.

The security guard whose biometric information has been validated by the system, can also access a "Currently in the Building" screen, shown in FIG. 16, providing information about all visitors remaining in the building at a particular moment in time. Similarly to the "Expected Visitors" screen, shown in FIG. 14, the remaining visitors are sorted by the companies they are scheduled to visit. By clicking on a company's name, the security guard will access the list of this company's visitors remaining in the building at that time, shown in FIG. 17. This list is preferably sorted by visitors' names and indicates the time when the visitor entered the building. The security guard may enter the time when the visitor leaves the building by selecting the "went out" link provided on the screen.

Figure 18:
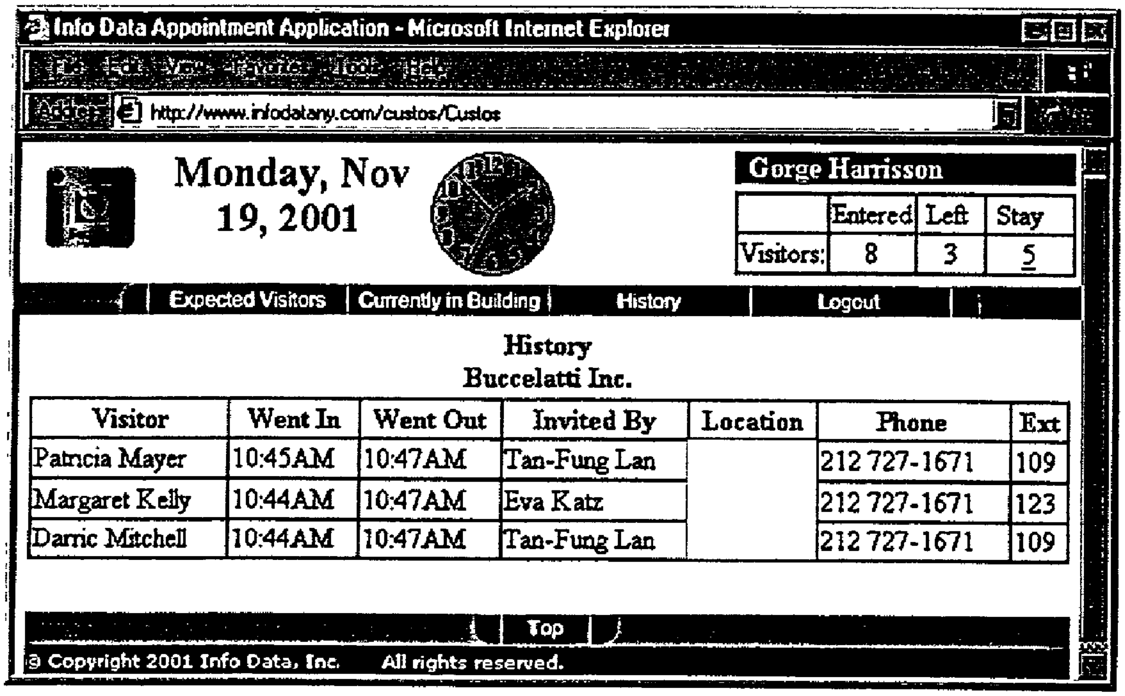
FIG. 18 is a screen shot of a screen showing information about visitors who already left the building.
Figure 19:
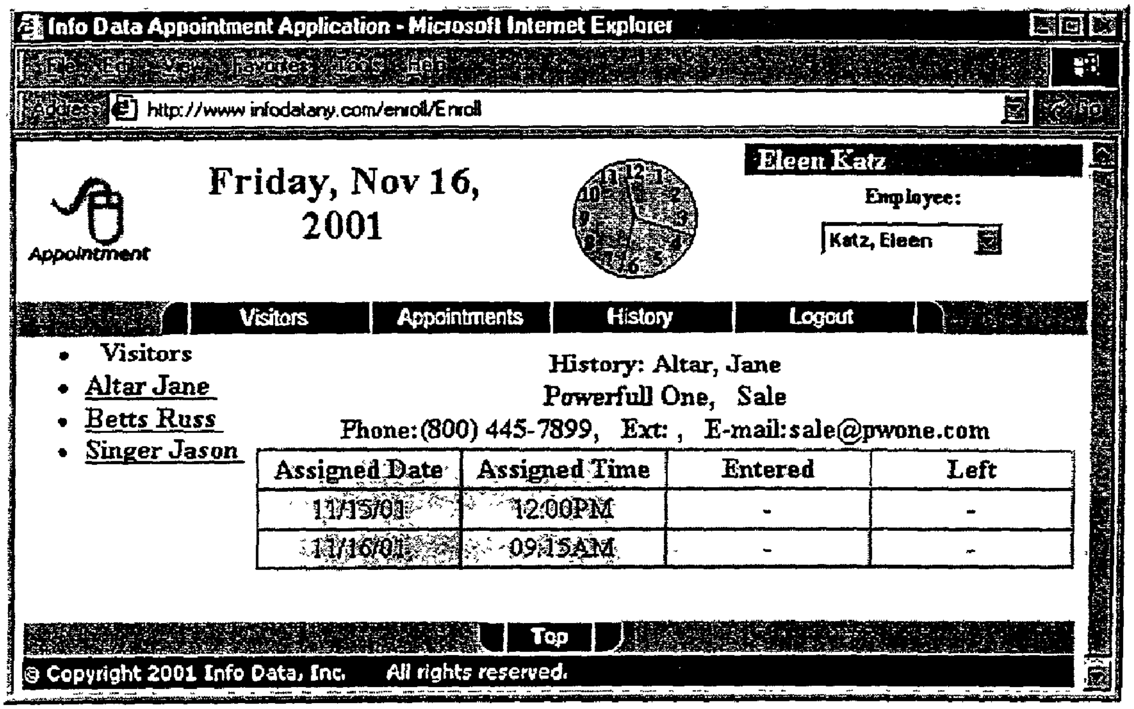
FIG. 19 is a screen shot of a screen showing information about individual visitors.

The validated security guard may also access the "History" screen, shown in FIG. 18, which allows the security guard to see information about visitors who already left the building. Similarly to the expected and currently in the building visitors information, the history information is also organized by the visited company. By selecting the name of the company, the security guard can access information about individual visitors, shown in FIG. 19. This list provides information about the time a particular visitor entered and left the building.

Alternatively, the list of all visitors in the building may be displayed on the security guard's screen immediately when he/she logs into the system. This screen allows the guard to see all visitors without selecting individual companies first. The guard may register the time when a particular visitor leaves the building by clicking on the "went out" link and entering the required information. Similarly, the list of all expected visitors and the list of all visitors who already left the building may be displayed for the security guard.

In the preferred embodiment, the security employee interface 40 constantly displays a number of visitors who entered the building, the number of visitors currently in the building, and the number of visitors who left the building. This information is preferably provided on every screen of the security employee interface. A link to the names and location of the visitors who are remaining in the building may be provided.

As stated above, some security employees may be given a privileged access to a security report feature of the present invention. The security report may be created for a selected period of time and sorted by company name, employee name, date, visitor name, etc. Further customization of the security report may be accomplished by selecting all appointments, completed appointments only, unperformed appointments only, etc. Each report preferably has a summary level, preferably listing a number of visitors within a selected category, and a detailed level, preferably listing names, location and other detailed information about selected visitors. The report allows security personnel to monitor visiting activity in the building at any moment in time.

As disclosed above, visitors' information, employees' information (including biometric information), security guards' information (including biometric information), companies' information and so on, may be stored in the database 12. The database 12 also stores all scheduled appointments, regardless of whether they have been approved or not. All described user interfaces are configured to exchange data with the database 12. For example, to generate the described visitors report, an authorized security employee will enter desired time frame and other conditions for the report into the security employees interface, which will compose a request and convey this request to the processor 14. The processor 14 will, in turn, cause the database 12 to retrieve and send back to the interface the required information. The interface will then reconfigure the data and present it to the security guard in a readable format.

In the preferred embodiment, when a visitor arrives to his/her appointment with a building employee, the employee may indicate the arrival by providing a predetermined signal to the system. For example, the employee may upload his/her fingerprint to the system, therefore, signaling to the system the arrival of the visitor. When the appointment is over, the employee may signal exit of the visitor in a similar manner. The system will convey these signals to the security guard using the security employees interface 40. The interface 40 may also be provided with an alarm generating mechanism, which will alert the security guard when the visitor is delayed somewhere in the building for an unreasonably long time.

The security employees interface 40 may also be provided with a floor map of the office building. Therefore, an authorized security guard can monitor the exact location of the visitor in the building.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A building security system for a building, comprising: a database; a processor; a visitor interface means interfacing a building visitor with said database and said processor specifically designed for said building visitor to electronically schedule an appointment; an employee interface means interfacing an employee of a company occupying a space in said building with said database and said processor specifically designed for said employee of said company to control and analyze said electronic scheduling; and a security employee interface means interfacing a security employee with said database and said processor specifically designed for said security employee to monitor building visitors at any given time period.

2. The building security system according to claim 1, wherein said visitor interface means further comprise a scheduling means, said scheduling means being configured to schedule an appointment for said visitor.

3. The building security system according to claim 2, wherein said occupant interface further comprises an appointment confirmation means, said appointment confirmation means being configured to confirm said scheduled appointment.

4. The building security system according to claim 1, wherein said occupant interface further comprises a biometric verification means, said biometric verification means being configured to obtain and verify biometric data of said company employee.

5. The building security system according to claim 1, wherein said occupant interface further comprises a schedule managing means, said schedule managing means being configured to manage said company employee's schedule.

6. The building security system according to claim 1, wherein said database further comprises a plurality of database segments and wherein said occupant interface means allows a particular company employee having an appropriate authorization to access at least one of said database segments.

7. The building security system according to claim 6, wherein said occupant interface further comprises an occupant switching means, said occupant switching means being configured to allow said particular building occupant company employee to access a plurality of said database segments.

8. The building security system according to claim 1, wherein said security interface means further comprises a monitoring means, said monitoring means being configured to monitor said building visitor.

9. The building security system according, to claim 1, wherein said security interface means further comprises an access pass generator generating an access pass for said building visitor.

10. The building security system according to claim 1, wherein said security interface means further comprises a reporting means, said reporting means being configured to generate security reports with respect to said building visitor.

11. The building security system according to claim 1, wherein said security interface means further comprises a biometric verification means, said biometric verification means being configured to obtain and verify biometric data of said security employee.

12. A method of providing a secured access to an office building comprising the steps of: electronic scheduling of appointments by a building visitor using a visitor interface specifically designed for said building visitor; controlling and analyzing said electronic scheduling of said appointments by an employee of a company occupying a space in said office building using an employee interface specifically designed for said employee of said company; and monitoring building visitors at any given time period by a security employee using a security employee interface specifically designed for said security employee.

13. The method of providing a secured access according to claim 12, wherein said step of controlling and analyzing said electronic scheduling further comprises confirming said scheduled appointments.

14. The method of providing a secured access according to claim 12, wherein said step of controlling and analyzing said electronic scheduling further comprises verifying a biometric information of said company employee.

15. The method of providing a secured access according to claim 12, wherein said step of controlling and analyzing said electronic scheduling further comprises managing said company employee's schedule.

16. The method of providing a secured access according to claim 12, wherein said step of controlling and analyzing said electronic scheduling further comprises interfacing said company employee with at least one database segment.

17. The method of providing a secured access according to claim 12, wherein said step of monitoring building visitors further comprises generating an access pass for at least one of said building visitors.

18. The method of providing a secured access according to claim 12, wherein said step of monitoring building visitors further comprises generating a security report with respect to at least one of said building visitors.

19. The method of providing a secured access according to claim 12, wherein said step of monitoring building visitors further comprises verifying a biometric information of a security employee.

* * * * *